United States Patent
Le Roux et al.

(10) Patent No.: US 9,601,130 B2
(45) Date of Patent: Mar. 21, 2017

(54) METHOD FOR PROCESSING SPEECH SIGNALS USING AN ENSEMBLE OF SPEECH ENHANCEMENT PROCEDURES

(71) Applicant: Mitsubishi Electric Research Laboratories, Inc., Cambridge, MA (US)

(72) Inventors: Jonathan Le Roux, Somerville, MA (US); Shinji Watanabe, Arlington, MA (US); John R Hershey, Winchester, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 381 days.

(21) Appl. No.: 13/945,469

(22) Filed: Jul. 18, 2013

(65) Prior Publication Data
US 2015/0025880 A1 Jan. 22, 2015

(51) Int. Cl.
*G10L 21/0232* (2013.01)
*G10L 15/06* (2013.01)
*G10L 21/0208* (2013.01)
G10L 21/02 (2013.01)
G10L 21/0272 (2013.01)
G10L 21/0216 (2013.01)
G10L 25/78 (2013.01)

(52) U.S. Cl.
CPC ........ *G10L 21/0232* (2013.01); *G10L 15/063* (2013.01); *G10L 21/0208* (2013.01); *G10L 21/02* (2013.01); *G10L 21/0272* (2013.01); *G10L 25/78* (2013.01); *G10L 2021/02163* (2013.01)

(58) Field of Classification Search
CPC . G10L 21/02; G10L 21/0208; G10L 21/0232; G10L 21/0272; G10L 21/0364
See application file for complete search history.

(56) References Cited

U.S. PATENT DOCUMENTS

2001/0041976 A1* 11/2001 Taniguchi ........... G10L 21/0208
704/226
2006/0074646 A1* 4/2006 Alves .................. G10L 21/0208
704/226

(Continued)

FOREIGN PATENT DOCUMENTS

JP 20000148185 A 5/2000
JP 20120508903 A 10/2012

OTHER PUBLICATIONS

Srinivasan et al., "Binary and ratio time-frequency masks for robust speech recognition." Speech Communication 48.11 (2006): 1486-1501.*

(Continued)

*Primary Examiner* — Samuel G Neway
(74) *Attorney, Agent, or Firm* — Gene Vinokur; James McAleenan; Hironori Tsukamoto

(57) ABSTRACT

A method processes an acoustic signal that is a mixture of a target signal and interfering signals by first enhancing the acoustic signal by a set of enhancement procedures to produce a set of initial enhanced signals. Then, an ensemble learning procedure is applied to the acoustic signal and the set of initial enhancement signals to produce features of the acoustic signal.

17 Claims, 2 Drawing Sheets

(56) References Cited

U.S. PATENT DOCUMENTS

| | | | | |
|---|---|---|---|---|
| 2009/0097670 A1* | 4/2009 | Jeong | ............ | H04R 3/005 381/73.1 |
| 2011/0123045 A1* | 5/2011 | Tasaki | ............ | G10L 21/0208 381/94.2 |
| 2011/0170707 A1* | 7/2011 | Yamada | ............ | G10L 21/0216 381/94.1 |
| 2011/0182437 A1* | 7/2011 | Kim | ............ | G10L 21/0232 381/73.1 |
| 2012/0232896 A1 | 9/2012 | Taleb et al. | | |
| 2013/0332157 A1* | 12/2013 | Iyengar | ............ | G10L 15/20 704/233 |
| 2015/0025880 A1* | 1/2015 | Le Roux | ............ | G10L 21/0232 704/233 |

OTHER PUBLICATIONS

Kim et al., "An algorithm that improves speech intelligibility in noise for normal-hearing listeners." The Journal of the Acoustical Society of America 126.3 (2009): 1486-1494.*

J. G. Fiscus, "A post-processing system to yield reduced word error rates: Recognizer output voting error reduction (rover)," in IEEE Workshop on Automatic Speech Recognition and Understanding (ASRU), 1997, pp. 347-354.

J. Barker, E. Vincent, N. Ma, H. Christensen, "The Pascal chime speech separation and recognition challenge," Computer Speech & Language, 2012.

Amit Das et al. "Constrained Iterative Speech Enhancement Using Phonetic Classes," IEEE Transactions on Audio, Speech and Language Processing. vol. 20., No. 6. Aug. 1, 2012. pp. 1869-1883.

Mporas et al. "Collaborative Speech Enhancement Approach for Speech Recognitoin in Motorcycle Environment," Digital Signal Processing, 2009 16th International Conferance on, IWWW. Jul. 5, 2009. pp. 1-6.

Khaldi et al. "Speech Denoising by Adaptive Weighted Average Filtering in the EMD Framework," Signals, Circuits and Systems, 2008. SCS , 2nd International Conference on, IWWW. Nov. 7, 2008. pp. 1-5.

Zaur Nasibov. "Decision Fusion of Voice Activity Detectors," Master's thesis, School of Computing, University of Eastern Finland, Apr. 16, 2012.

* cited by examiner

METHOD FOR PROCESSING SPEECH SIGNALS USING AN ENSEMBLE OF SPEECH ENHANCEMENT PROCEDURES

FIELD OF THE INVENTION

This invention relates generally to speech processing, and more particularly to enhancing speech signals that include interference.

BACKGROUND OF THE INVENTION

Speech Enhancement

Speech enhancement methods attempt to improve the quality and intelligibility of speech that has been degraded by noise or other interfering processes with the aim, in part, to improve speech recognition. This is a difficult problem because there are many types of interferences. Typically the speech is mixed with a noisy background of multiple competing sound sources from an acoustically cluttered environment. To further complicate matters, the operational constraints on computational resources and latency in real-time applications often preclude the use of complex models that could represent and adapt to many different interferences. Because it is difficult for a simple method to accommodate the variety of conditions, some assumptions about the statistical properties of the underlying speech and the interference are usually made.

Many different enhancement methods, each having different explicit or implicit assumptions about the nature of the speech and the interference, are known. However, many of those methods improve some pails of the signal, while often deteriorating others.

Ensemble Learning

Ensemble learning methods typically combine a finite set of alternative models, and exploit the independence of errors made by each model to reduce an estimation variance, and hence an error rate. Those methods range from simple voting procedures, where quantities inferred by each model are averaged, to stacking, in which a secondary model is trained to perform the combination in a way that is adaptable to training data. As an advantage, voting methods can be applied without consideration of real-time conditions. However, stacking methods can learn more complex combination functions, potentially leading to better performance.

Ensemble methods have been used extensively in automatic speech recognition (ASR) to fuse speech recognition hypotheses of different recognizers via voting procedures such as recognizer output voting error reduction (ROVER). The ROVER system is a post-recognition process that models the output generated by multiple ASR systems as independent knowledge sources that can be combined and used to generate an output with a reduced error rate.

Particularly, relevant ensemble ASR methods differ according to the front end ASR processing. A primary advantage of ensemble ASR methods is that they can use a variety of existing methods to improve performance.

SUMMARY OF THE INVENTION

The embodiments of the invention provide a method to process acoustic signals. The method is based on the recognition that many methods have different advantages and suffer from different flaws. The invention combines the strengths of multiple acoustic signal enhancement procedures, and formulate the enhancement problem as an ensemble learning framework. The combination of the enhancement procedures can significantly improve the enhancement.

Specifically, the method processes an acoustic (speech) signal that is a mixture of a target signal and interfering signals by enhancing the acoustic signal by an ensemble of enhancement procedures to produce initial enhanced signals. The enhanced signals are then combined by an ensemble learning method to determine features of the acoustic signals. A particular case is for the features to be an enhanced acoustic (speech) signal.

One possible way to do this is to construct representations of the output of each enhancement procedure in a common domain, combine these representations so that the combined representation is as close as possible to the representation associated with a clean target signal.

Specifically, a method processes an acoustic signal that is a mixture of a target signal and interfering signals by first enhancing the acoustic signal by a set of enhancement procedures to produce a set of initial enhanced signals. Then, an ensemble learning procedure is applied to the acoustic signal and the set of initial enhancement signals to produce features of the acoustic signal.

DETAILED DESCRIPTION OF THE PREFERRED EMBODIMENTS

Method Overview

Figure 1:
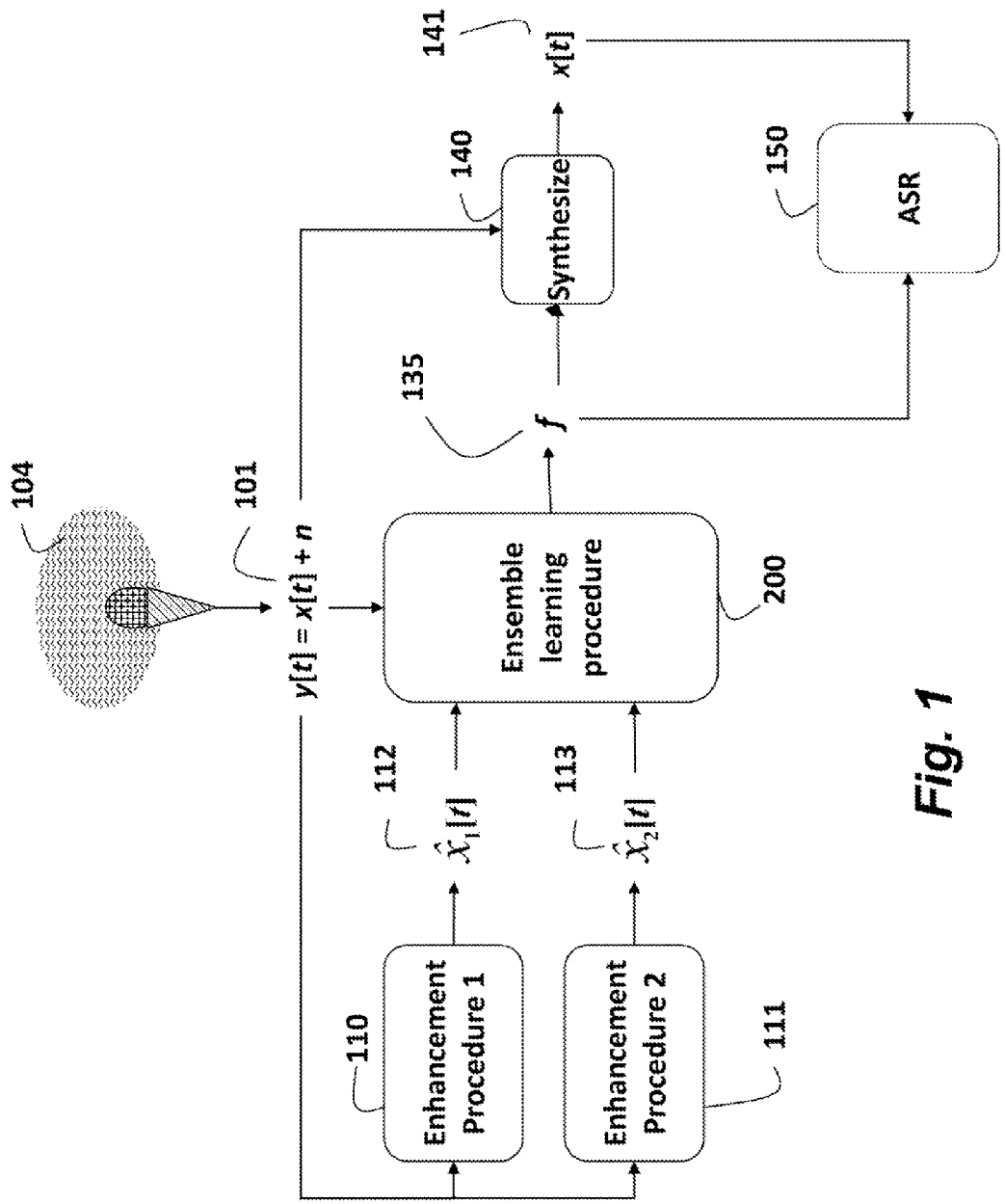
FIG. 1 is a flow diagram of a method for processing acoustic signals according to embodiments of the invention.

FIG. 1 shows a method for processing an acoustic signal 101 according to embodiments of our invention. In the preferred embodiment, the acoustic signal y[t] 101 is a mixture 101 of a speech signal x[t] and a variety of interfering signals n acquired from an acoustically complex and noisy environment 104. It is understood, that the method can be used to process other types of acoustic signals, e.g., sonar or ultrasound signals.

During preprocessing, we can sample and process the acoustic signal one frame at the time. A sampling rate of the signal can be 16 kHz. For features, a common time-frequency representation for signals can be obtained using short-time Fourier transform (STFT) with a frame length of 640 samples, 50% overlap, and a sine window for analysis and synthesis, for example. It is understood, that the method can be used for any acoustic signal that is a mixture of a target signal and interfering signal, and Wherein the enhancement separates out the target signal x from the noise n.

A set (ensemble) of J enhancement procedures [1, ..., J] 110-111 is applied to the input signal y[t] in the time domain to produce corresponding initial enhanced signals $\hat{x}_j[t]$ 111-112 in the time domain, where there is one enhanced signal for each enhancement procedure. The procedures 110-111 can be based on any number and kind of source separation or speech enhancement procedure, for example, vector-Taylor series (VTS), indirect VTS, optimal modified minimum mean-square error log-spectral amplitude with improved minimal controlled recursive averaging (OMLSA-IMCRA) minimum mean square error (MMSE), log-MMSE procedures, and combinations thereof. Two are shown in the example.

An ensemble learning procedure 200 takes the noisy signal 101 as input and combines the initial enhanced signals $x_j[t]$ 112-113 to produce features f 135. The features can be expressed directly or indirectly. For example, indirectly expressed features can be a filter or mask that inherently selects the features of interest in the signal as described below. Directly expressed features can be an estimate of the waveform of the target acoustic signal itself, or estimates of conventional ASR features of the target acoustic such as MFCCs.

During postprocessing, if the features are indirectly expressed features, such as a filter or mask, the features can be used to synthesize 140 the target signal x[t] 141 from the noisy input signal y[t] 101. The features 135 or the target signal 141 can be further processed by an automatic speech recognition system (ASR) 150.

The Method can be performed in a processor connected to memory and input/output interfaces as known in the art.

Figure 2:
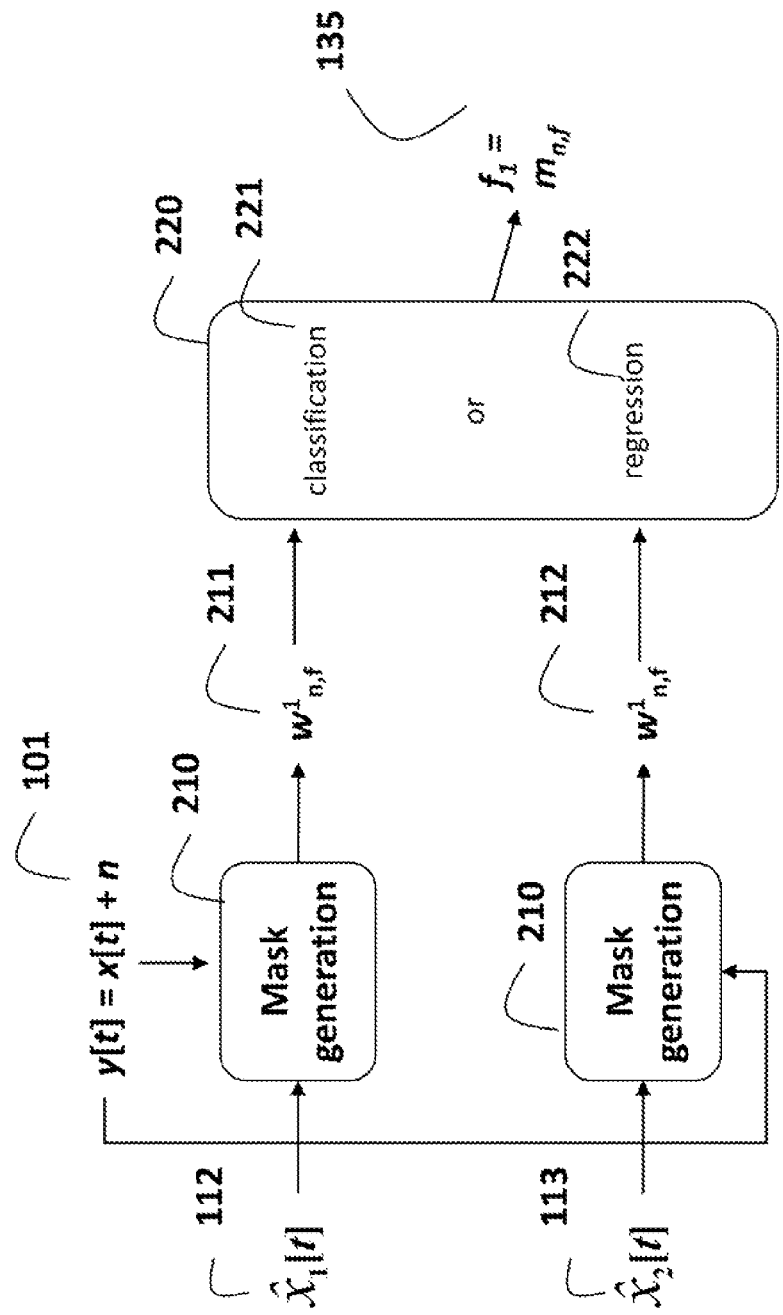
FIG. 2 is a flow diagram of an ensemble learning procedure according to embodiments of the invention.

FIG. 2 shows an example ensemble learning procedure 200 in greater detail. Using the acoustic signal 101, mask generation 210 is applied to each initial enhanced signal $x_j[t]$ to produce initial features or masks $w^j_{n,f}$ 211-212. The masks can be weights. An ensemble learning procedure is used to estimate target masks that correspond to the target acoustic signal. If the target masks are binary, the ensemble learning procedure can be a classification method 221, and if they are continuous, the ensemble learning procedure can be a regression method 222.

The parameters of the ensemble learning procedure can be learned from training data for which both noisy and noise-free signals are available.

The steps of the above method can be performed in a processor connected to memory and input and output interfaces as known in the art. The processing can be performed in real-time.

General Consideration

In the above method, the ensemble of speech enhancement procedures are treated as black boxes in the sense that we only use the initial enhanced signals during the combining 200. Our goal is to be able to use arbitrary models and avoid the use of heterogeneous features.

Thus, we perform the combination in a domain that is independent of the domains used by the enhancement procedures. A good choice for such a domain is the short-time power spectrum, which is widely used in signal processing because of its relative insensitivity to phase, and the ability to reveal time and frequency patterns m the signal. Regardless of the internal representation used, the speech enhancement procedures take as input the "noisy" signal y[t] 101 in the time domain and transform the signal to the initial enhanced signals $\hat{x}_n[t]$ 112-113. In the short-time power spectrum domain, the enhancement process can be approximated by applying a mask to the spectrogram of the noisy input signal.

Implementation Details

For the initial enhanced signals 112-113 produced by each enhancement procedure in our ensemble, we generate a corresponding weighted mask $w^{(j)}_{n,f}$ for time frame n and frequency f. We also generate a target mask $w^*_{n,f}$ that transforms the noisy spectrum to the clean spectrum. For simplicity, the masks are functions and can be approximated as binary masks $m^{(j)}_{n,f}$ and $m^*_{n,f}$. The binary target mask $m^*_{n,f}$ is convenient t for the classification in that the ensemble inference enhancement can be posed as estimating a binary mask $\hat{m}^*_{n,f}$ 135 using as input the weighted masks $\{w^1_{n,f}, \ldots, w^J_{n,f}\}$, or their binary counterparts, derived from each enhancement procedure.

Target Signal

The target speech signal for our method is the final enhanced or "clean" signal x[t]. The time-frequency masks are applied to the noisy mixture representation $Y_{n,f}$ to perform the speech enhancement. Time-frequency masks apply a weight w to each element in the time-frequency representation of the acoustic input. The representation can be cochleograms, STFT, wavelet transforms and so on, to emphasize regions that are dominated by the target signal and suppress regions that are dominated by interfering sources. The weights can be binary or continuous. Continuous values can be considered as the ratio between the target signal and the acoustic signal, as in a Wiener filter, or as the probabilities that corresponding time-frequency elements are associated with the target signal.

Restricting the mask to binary values is a reasonable approximation to the optimal masking in general conditions. We assume the noise is non-stationary, such as speech by other speakers, home noises, street noise, or music, making the denoising task difficult. However, it is easier to estimate binary values instead of a continuous values. Thus, we mainly focus on binarized masks obtained from the clean speech for our method, but also consider the use of continuous masks in a regression method.

Input Signals

As described above, each enhancement procedure processes the input signal in a different domain, whether directly in the time domain or in some time-frequency representation, such as the STFT, or a gammatone-based transform, with various filterbank settings. Instead of directly combining the inner representations, we focus on the estimates of the enhanced time-domain target signal.

For the combining, we can use any type of features. For convenience and simplicity, we re-analyze all enhanced signals using a common time-frequency representation used to derive the target signal. This enables us to have a direct correspondence between the time-frequency elements of the input features and those of the target signal.

To avoid scaling issues for the features, we do not directly use features, such as a power spectrogram or log-power spectrogram. Instead, we indirectly define the features as equivalent weighted masks $w^{(j)}$ for each procedure as a ratio of the power spectrogram of the (initial) enhanced signal $\hat{X}^{(j)}$ to that of the noisy mixture signal Y:

$$w^{(j)}_{n,f} = \frac{\hat{X}^{(j)}_{n,f}}{Y_{n,f}}, \tag{1}$$

and similarly for the target mask $w^*_{n,f}$ obtained from the ratio of the power spectrogram of the target clean speech to that of the noisy mixture. This approximates each procedure as a reweighting in a common time-frequency representation.

We also generate the binary masks $m^{(j)}_{n,f}=[w^{(j)}_{n,f}>0.5]$, from the weighted masks. Similarly, we produce binary target masks $m^*_{n,f}=[w^*_{n,f}>0.5]$, where $[a>b]=1$ if $a>b$ and 0 otherwise. The binary masks can reduce the computational complexity when compared with the weighted masks, for example, when support vector machines (SVM) and decision trees are used in the ensemble learning procedure.

Inference Methods

For inference, voting or averaging procedures on the input signals or their masks can be used. We can also use stacking-based ensemble learning methods where the combining is learned from training data. In the context of stacking, we can also consider including the temporal and frequency context in the neighborhood of each masking value to be estimated in the input features of the ensemble learning method. After the combined mask is generated, the mask is applied to the noisy signal spectrum to produce the target signal 141.

Voting

Voting or averaging is an ensemble combination strategy that averages the combination of the outputs. In the case of the classification 221, the output is usually the mode of the distribution over classes. With the regression method 222, the output is the mean or some other average of the output values. Uncertainty within each model can also be considered.

In voting, weighted or binary mask values at time-frequency element (n,f) are used to estimate the target mask $m^*_{n,f}$ at the same time-frequency element. The input feature vectors to estimate $m^*_{n,f}$ are typically $z_{n,f}=(w^{(1)}_{n,f},\ldots,w^{(J)}_{n,f})^T$ for the weighted masks, and $z_{n,f}=(m^{(1)}_{n,f},\ldots,m^{(J)}_{n,f})^T$ for the binary masks.

If the weighted masks are used as inputs to the voting method, then we can use, for example, the mean of the masking values as a weighted mask estimate:

$$\hat{w}^{average}_{n,f} = \frac{1}{J}\sum_j w^{(j)}_{n,f} = \frac{1}{J}\sum_j \hat{X}^{(j)}_{n,f}/Y_{n,f}, \qquad (2)$$

which corresponds to averaging the original power spectrum estimates. We can also use the median in a similar way.

If the binary masks are used as inputs to the voting method, then voting can for example, consider the mode of the masking Value distribution:

$$\hat{m}^{voting}_{n,f} = \left[\frac{1}{J}\sum m^{(j)}_{n,f} > 0.5\right]. \qquad (3)$$

Because there are no learned parameters, voting methods cannot over-fit the training data. To the extent that the masking values make uncorrelated errors, the voting and averaging procedures tend to recover from these errors. In other words, the variance across classifiers can be reduced by the voting procedure.

Stacking

Stacking is an ensemble learning technique in which multiple estimation methods for the same task are used as input into a method that is trained on data to combine the results. Stacking can reduce bias even, when the outputs of the ensemble are correlated. However, the learning can over-fit the training data. The binary masks enable us to use simple binary classifiers to generate the estimate of the target signal. We can also use different forms of regression to produce weighted mask estimates. We mainly focus on a classification-based approach. We can use a number of classifiers, such as one based on a decision tree (DT), support vector machine (SVM), naive Bayes (NB), and Random Forest (RF).

We use one classifier $C^f_{\Theta^f}$ for each frequency f, with parameters $\Theta^f$. At each time frame n for an input vector $i_{n,f}$, the classifier produces a mask estimate $\hat{m}_{n,f}=C^f_{\Theta^f}(i_{n,f})$. We learn the parameters $\Theta^f$ that minimize a loss function L with respect to the target mask $m^*_{n,f}$ on training data T $$\overline{\Theta}^f=\mathrm{argmax}_{\Theta^f}L[(C^f_{\Theta^f}(i_{n,f}),m^*_{n,f}),n\in T], \forall f. \qquad (4)$$

During operation, we estimate the mask using the learned parameters $\overline{\Theta}^f$:

$$\hat{m}_{n,f} = C^f_{\overline{\Theta}^f}(i_{n,f}), \forall n, f. \qquad (5)$$

The loss function L is determined according to the classifier type.

For the stacking, we can include time or frequency context information in the features. We can extend the features in the time direction by $c^{(n)}$ frames to the left and to the right, and in the frequency direction by $c^{(f)}$ frequencies below and above. The input feature vector to estimate $m^*_{n,f}$ is a concatenation of time-frequency patches with $(2c^{(n)}+1)\times(2c^{(f)}+1)$ elements in the neighborhood of the time-frequency element (n,f) for each procedure. The boundary cases in both directions are handled appropriately.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for processing an acoustic signal, wherein the acoustic signal is a mixture of a target signal and interfering signals, comprising the steps of:
   enhancing the acoustic signal by a set of enhancement procedures to produce a set of initial enhanced signals;
   obtaining, for each initial enhanced signal an input mask, which represents an effect of the corresponding enhancement procedure on the acoustic signal, by comparing the initial enhanced signal to the acoustic signal:
   determining features of the target signal using a combination of the input masks, wherein parameters of the combination are trained on data processed using the set of enhancement procedures; and
   synthesizing the target signal from the acoustic signal using the features, wherein the steps are performed in a processor.

2. The method of claim 1, wherein the set of enhancement procedures are selected from a group consisting of vector-Taylor series (VTS), indirect VTS, optimal modified minimum mean-square error log-spectral amplitude with improved minimal controlled recursive averaging, minimum mean square error (MMSE), log-MMSE procedures, and combinations thereof.

3. The method of claim 1, wherein the features are continuous masks and the combination is a regression function.

4. The method of claim 1, wherein the features are binary masks and the combination is a classification method.

5. The method of claim 1, wherein the target signal is speech, and further comprising:
applying automatic speech recognition to the target signal.

6. The method of claim 1, wherein the features include a target mask that transforms a noisy spectrum of the acoustic signal to a clean spectrum of the target signal.

7. The method of claim 1, wherein the features are masks in a time-frequency representation and a time-frequency representation of the acoustic signal is available; and
applying, in the time-frequency representation, the masks to the acoustic signal.

8. The method of claim 7, wherein the time-frequency representation of the acoustic signal includes discrete time-frequency elements and the masks include weights, and further comprising:
applying the weights to the time-frequency elements.

9. The method of claim 8, wherein the time-frequency representation is selected from a group consisting of cochleograms, short-time Fourier transforms and wavelets.

10. The method of claim 1, wherein the features are weighted masks that have continuous values representing an energy ratio between the target signal and the acoustic signal.

11. The method of claim 1, wherein combination is performed on the initial enhanced signals in a time-frequency domain representation.

12. The method of claim 11, further comprising:
converting the time-frequency representations of the initial enhanced signals into masks.

13. The method of claim 1, wherein the combination includes at least of a decision tree (DT), a support vector machine (SVM), a naive Bayes (NB), and a random forest (RF).

14. The method of claim 1, wherein the combination is determined using one or combination of a classifier and a regression function trained for the set of enhancement procedures.

15. The method of claim 1, wherein the combination includes a binary classifier.

16. A non-transitory computer readable memory embodied thereon a program executable by a processor for performing a method, the method comprising:
enhancing the acoustic signal by a set of enhancement procedures to produce a set of initial enhanced signals;
obtaining, for each initial enhanced signal an input mask, which represents an effect of the corresponding enhancement procedure on the acoustic signal, by comparing the initial enhanced signal to the acoustic signal:
determining features of the target signal using a combination of the input masks, wherein parameters of the combination are trained on data processed using the set of enhancement procedures: and
synthesizing the target signal from the acoustic signal using the features.

17. The method of claim 16, wherein the combination is one or combination of a decision tree (DT), a support vector machine (SVM), a naive Bayes (NB), and a random forest (RF).

* * * * *